US012180758B2

(12) United States Patent
Wang et al.

(10) Patent No.: US 12,180,758 B2
(45) Date of Patent: Dec. 31, 2024

(54) ELECTRONIC LOCK COMPONENTS

(71) Applicant: Primax Electronics Ltd., Taipei (TW)

(72) Inventors: Li-Chun Wang, Taipei (TW); Meng-Chieh Liu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 184 days.

(21) Appl. No.: 18/107,457

(22) Filed: Feb. 8, 2023

(65) Prior Publication Data

US 2024/0200361 A1 Jun. 20, 2024

(30) Foreign Application Priority Data

Dec. 15, 2022 (TW) .................................. 111148316

(51) Int. Cl.
*E05B 9/08* (2006.01)

(52) U.S. Cl.
CPC ...................................... *E05B 9/08* (2013.01)

(58) Field of Classification Search
CPC ......... Y10T 70/5199; E05B 9/02; E05B 9/08; E05B 9/082; E05B 47/00; E05B 17/00; E05B 15/1635; E05B 49/00; E05B 2015/1664; E05B 2015/1635; E05B 2015/1657; E05B 47/02; E05B 47/0005; E05B 47/0012
USPC ............................................................ 70/101
See application file for complete search history.

(56) References Cited

U.S. PATENT DOCUMENTS

| | | | | | |
|---|---|---|---|---|---|
| 5,970,756 | A * | 10/1999 | Miller | E05B 17/2084 | 70/168 |
| 7,535,731 | B2 * | 5/2009 | Peng | H05K 7/142 | 361/801 |
| 10,808,420 | B2 * | 10/2020 | Morstatt | E05B 17/002 | |
| 11,744,413 | B2 * | 9/2023 | Lang | E05B 63/0056 | 222/181.1 |
| 2011/0149487 | A1 * | 6/2011 | Lin | H04M 1/0262 | 361/679.01 |
| 2023/0193655 | A1 * | 6/2023 | Yu | E05B 63/0056 | 70/466 |

FOREIGN PATENT DOCUMENTS

| | | | | |
|---|---|---|---|---|
| CN | 108798240 A | * 11/2018 | E05B 15/16 |
| CN | 111852188 A | * 10/2020 | |
| CN | 217631834 U | * 10/2022 | |
| CN | 217957541 U | * 12/2022 | |
| DE | 2815526 B1 | * 7/1979 | |
| DE | 3230545 A1 | * 2/1984 | |

(Continued)

*Primary Examiner* — Suzanne L Barrett

(74) *Attorney, Agent, or Firm* — KIRTON McCONKIE; Evan R. Witt

(57) ABSTRACT

The electronic lock components include a bracket and an electronic lock body. The bracket includes an extension disposed on a side edge of the bracket and perpendicular to the bracket. The electronic lock body includes: a back cover body, including a buckle disposed on a surface of the back cover body facing away from the bracket and adjacent to a side edge of the back cover body, and the buckle including a cantilever portion, and the cantilever portion including a stop portion and a hook coupled to and located beneath the stop portion; and a main cover body, including a pushing portion disposed on an inner surface of a sidewall of the main cover body and facing the stop portion.

18 Claims, 6 Drawing Sheets

(56) References Cited

FOREIGN PATENT DOCUMENTS

| | | | | | |
|---|---|---|---|---|---|
| DE | 3335665 | A | * | 4/1985 | ........... H05K 5/0013 |
| DE | 3722398 | A | * | 1/1989 | ........... H05K 5/0013 |
| DE | 4309768 | A1 | * | 9/1994 | ........... H01F 27/027 |
| DE | 29908345 | U1 | * | 7/1999 | ............. H05K 7/183 |
| DE | 10103950 | C1 | * | 8/2002 | ........... H05K 5/0013 |
| DE | 10229449 | B4 | * | 4/2004 | ........... E05B 65/087 |
| DE | 102014113761 | A1 | * | 3/2016 | ............. E05B 15/02 |
| DE | 102022124576 | A1 | * | 3/2024 | |
| GB | 2584101 | A | * | 11/2020 | ............. E05B 45/06 |
| JP | 2000183549 | A | * | 6/2000 | |
| KR | 20060039712 | A | * | 5/2006 | |
| TW | 640705 | U | * | 5/2023 | ........... F16M 13/022 |
| WO | WO-2013068083 | A1 | * | 5/2013 | .............. E05F 3/227 |
| WO | WO-2017142472 | A1 | * | 8/2017 | ............. E05B 47/02 |

* cited by examiner

ELECTRONIC LOCK COMPONENTS

FIELD OF THE INVENTION

The present disclosure relates to electronic lock components.

BACKGROUND OF THE INVENTION

At present, an electronic lock is usually assembled on a door lock bracket with screws or other moving parts. To remove the electronic lock, tools such as a screwdriver and tweezers are required. That is, assembly and disassembly processes of the current electronic lock is complicated and time-consuming.

SUMMARY OF THE INVENTION

The present disclosure provides electronic lock components, which include a bracket and an electronic lock body. The bracket includes an extension disposed on a side edge of the bracket and perpendicular to the bracket. The electronic lock body is configured to be assembled on the bracket or disassembled from the bracket. The electronic lock body includes: a back cover body, including a buckle disposed on a surface of the back cover body facing away from the bracket and adjacent to a side edge of the back cover body, and the buckle including a cantilever portion, and the cantilever portion including a stop portion and a hook coupled to and located beneath the stop portion, in which when the back cover body is leaned against the bracket and then moved downward, the buckle is also moved downward, so that the stop portion and the hook abut an upper edge of the extension and a portion of a lower edge of the extension, respectively; and a main cover body, including a pushing portion disposed on an inner surface of a sidewall of the main cover body and facing the stop portion, in which when the pushing portion is pushed toward the stop portion, the stop portion moves, and the hooks also moves to leave the portion of the lower edge of the extension.

In some embodiments of the present disclosure, the buckle further includes a fixing portion connected between the surface of the back cover body facing away from the bracket and the cantilever portion.

In some embodiments of the present disclosure, the stop portion extends in one direction, and the fixing portion extends in another direction opposite to the direction.

In some embodiments of the present disclosure, the cantilever portion further includes a connection portion, and opposite ends of the connection portion are respectively connected to the fixing portion and the hook, and a middle portion of the connection portion is connected to the stop portion.

In some embodiments of the present disclosure, an included angle between the fixing portion and the connection portion is about 90 degrees, and an included angle between the stop portion and the connection portion is about 90 degrees.

In some embodiments of the present disclosure, a thickness of a portion of the sidewall of the main cover body adjacent to the pushing portion is smaller than a thickness of another portion of the sidewall of the main cover body away from the pushing portion.

In some embodiments of the present disclosure, the bracket further includes a hook portion connected to the bracket, and the back cover body further includes a direction limiting piece separated from the buckle, and the direction limiting piece and the back cover body define a back opening and an upper opening, and the back opening is located on a surface of the back cover body facing the bracket, and the upper opening is close to a portion of the surface of the back cover body facing away from the bracket, in which when the back cover body is leaned against the bracket and the back opening is aligned with the hook portion, the direction limiting piece covers the hook portion, and when the back cover body is then moved downward, the direction limiting piece is also moved downward, so that a portion of the hook portion is exposed from the upper opening, and another portion of the hook portion is in contact with an upper wall of the back opening.

In some embodiments of the present disclosure, the portion of the hook portion is in contact with the portion of the surface of the back cover body facing away from the bracket.

In some embodiments of the present disclosure, a shape of the portion of the hook portion is complementary to a shape of the portion of the surface of the back cover body facing away from the bracket.

In some embodiments of the present disclosure, the electronic lock components further include: a tail piece, through the bracket; in which the electronic lock body further includes a rotating shaft located in the main cover body, and the rotating shaft has an opening, and an open end of the opening faces downward, in which when the back cover body is leaned against the bracket and then moved downward, the rotating shaft is also moved downward, so that a closed end of the opening engages with an end of the tail piece.

In some embodiments of the present disclosure, when the back cover body is leaned against the bracket, the open end of the opening is able to accommodate a portion of the end of the tail piece.

In some embodiments of the present disclosure, the back cover body further has a tail piece mounting hole through the back cover body, in which when the back cover body is leaned against the bracket, the tail piece mounting hole is able to accommodate a portion of the end of the tail piece.

In some embodiments of the present disclosure, the back cover body further has a shaft hole through the back cover body, and the shaft hole is located over and communicates with the tail piece mounting hole, and the rotating shaft is located in the shaft hole.

BRIEF DESCRIPTION OF THE DRAWINGS

Aspects of the present disclosure are best understood from the following embodiments, read in conjunction with the accompanying drawings. It should be understood, however, that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
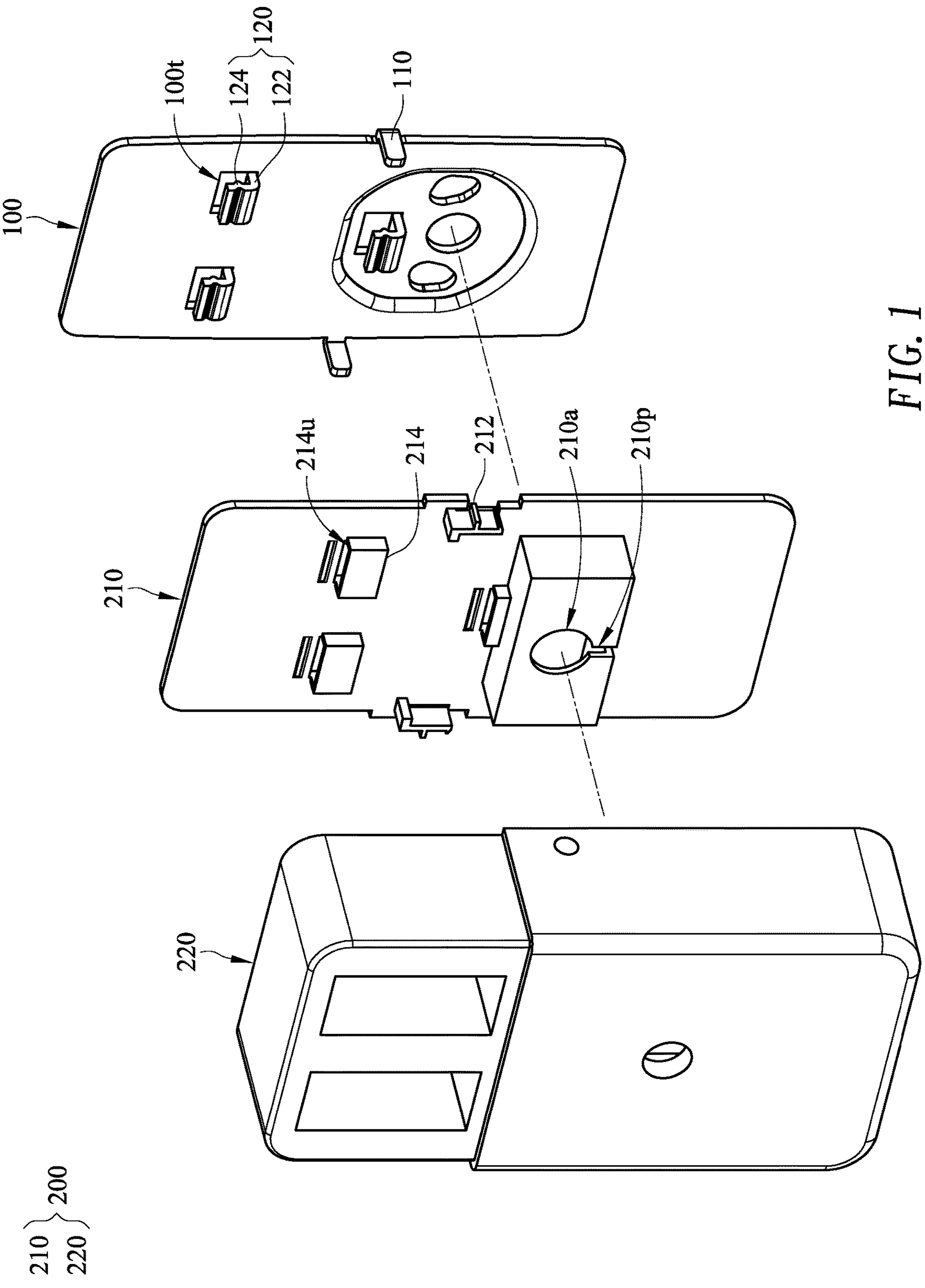
FIG. 1 is a front perspective exploded schematic diagram of a bracket and an electronic lock body according to an embodiment of the present invention.

The advantages and features of the present disclosure and the method for achieving the same will be described in more detail with reference to exemplary embodiments and the accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, the assembly and disassembly processes of the current electronic lock is complicated and time-consuming. Accordingly, the present invention provides electronic lock components including a bracket and an electronic lock body, and the electronic lock body of the present invention can be assembled on or disassembled from the bracket by one hand by designs of an extension of the bracket, a buckle of a back cover body of the electronic lock body, and a pushing portion of a main cover body of the electronic lock body, and the assembly and disassembly methods thereof are very simple, and thus the above technical issues can be solved. Various embodiments of the electronic lock components of the present invention will be described in detail below.

Figure 2:
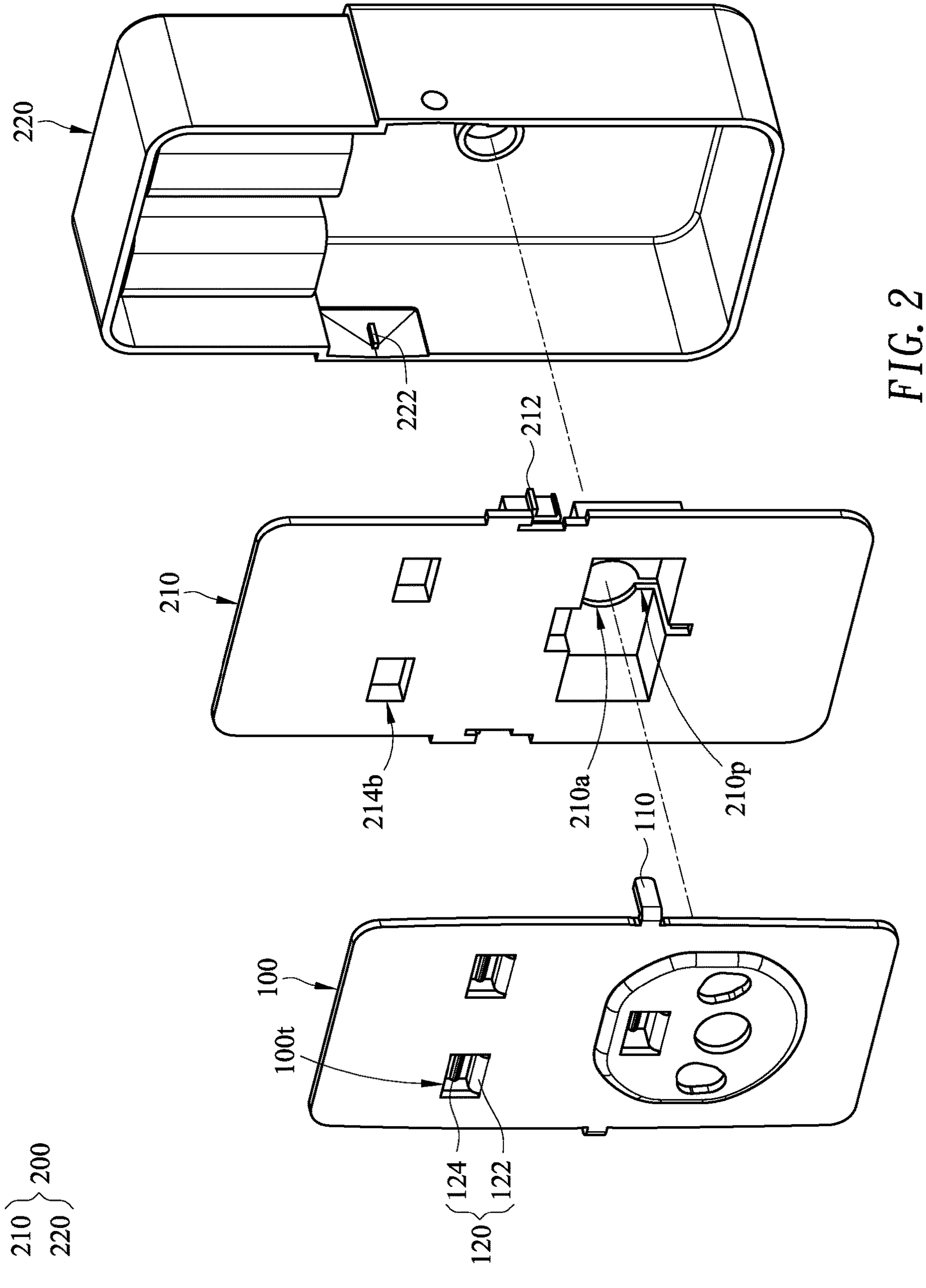
FIG. 2 is a rear perspective exploded schematic diagram of a bracket and an electronic lock body according to an embodiment of the present invention.

FIG. 1 is a front perspective exploded schematic diagram of a bracket and an electronic lock body according to an embodiment of the present invention. FIG. 2 is a rear perspective exploded schematic diagram of a bracket and an electronic lock body according to an embodiment of the present invention. As shown in FIGS. 1 to 2, the electronic lock components include a bracket (or may be called a door lock bracket) 100 and an electronic lock body 200. In some embodiments, the electronic lock components are mounted on an interior side of the door panel, so those may be referred to as interior electronic lock components.

Figure 7:
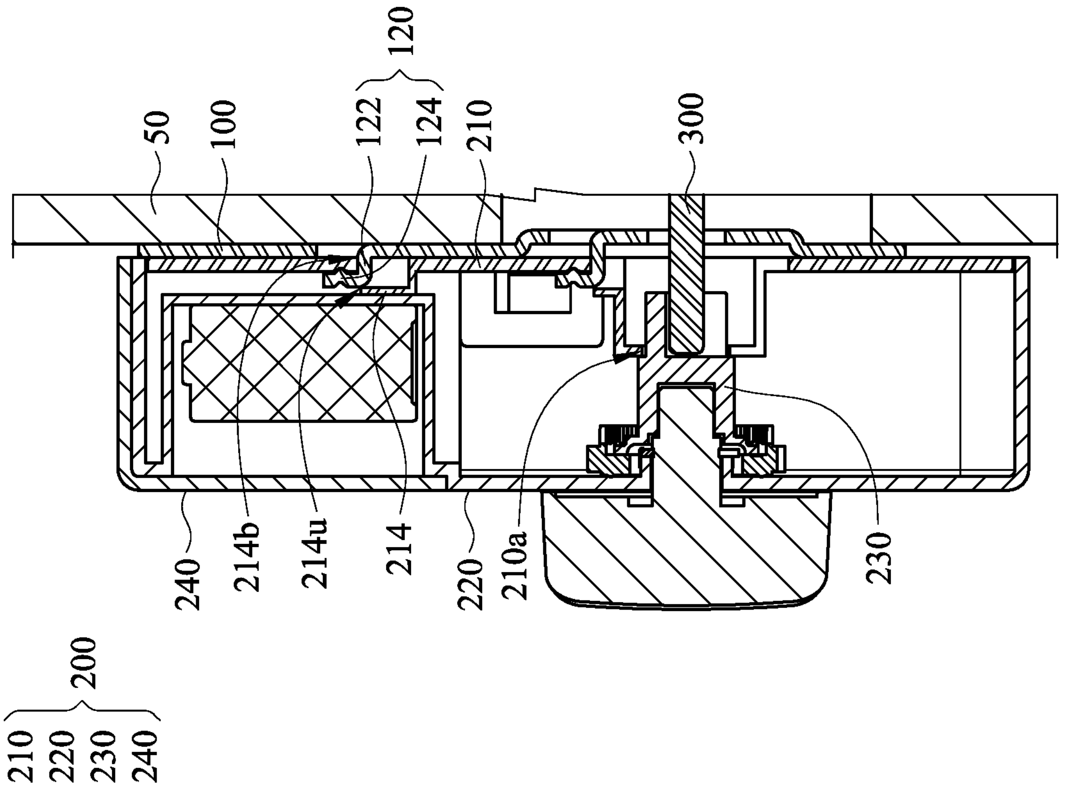
FIG. 7 is a side cross-sectional view of the electronic lock body of FIG. 6 after being moved downward.
Figure 6:
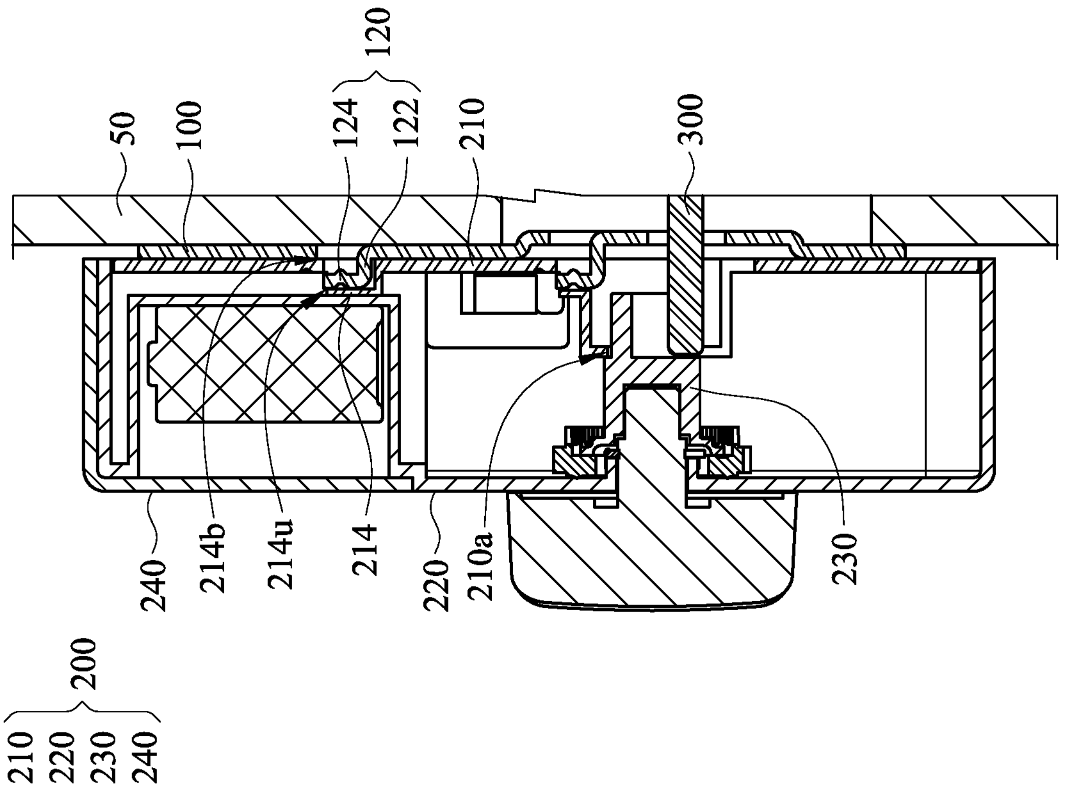
FIG. 6 is a side cross-sectional view of an electronic lock body leaned against a bracket according to an embodiment of the present invention.

The bracket 100 is configured to be mounted on a door panel (not shown in FIGS. 1 and 2, please refer to a door panel 50 in FIGS. 6 and 7). The bracket 100 includes an extension 110 disposed on a side edge of the bracket 100 and perpendicular to the bracket 100. In some embodiments, the extension 110 extends toward a side edge of the electronic lock body 200.

The electronic lock body 200 is configured to be assembled on the bracket 100 or to be disassembled from the bracket 100. The electronic lock body includes a back cover body 210 and a main cover body 220. In some embodiments, the extension 110 extends toward a side edge of the back cover body 210.

Figure 4:
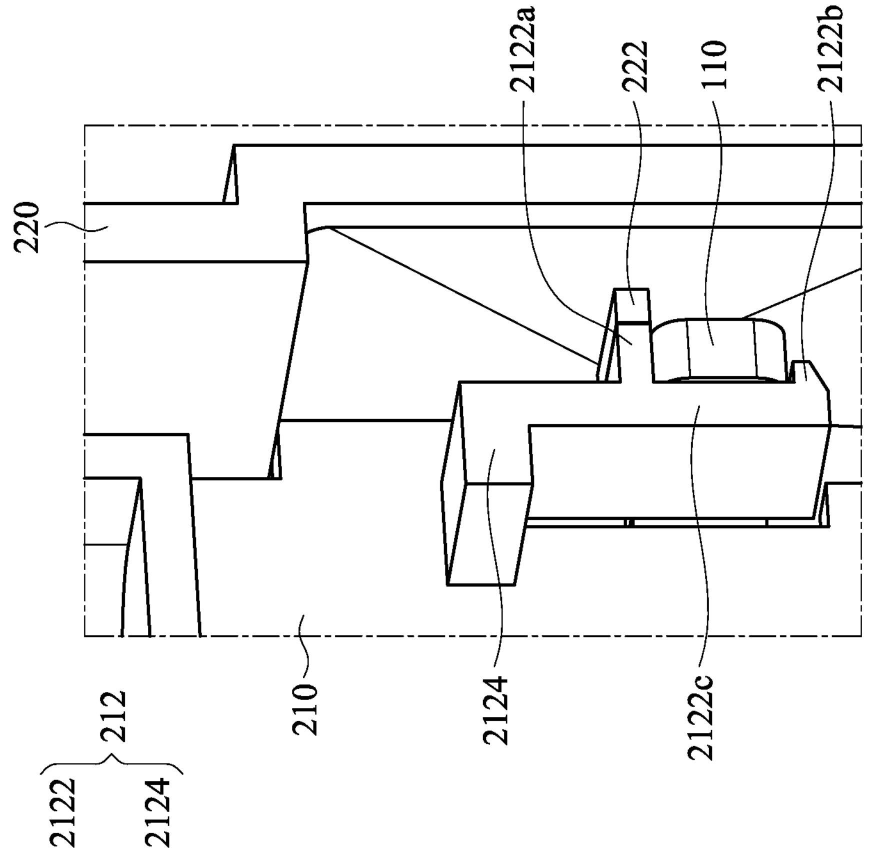
FIG. 4 is a front perspective schematic diagram of the extension, the buckle and the pushing portion after the electronic lock body of FIG. 3 is moved downward.
Figure 3:
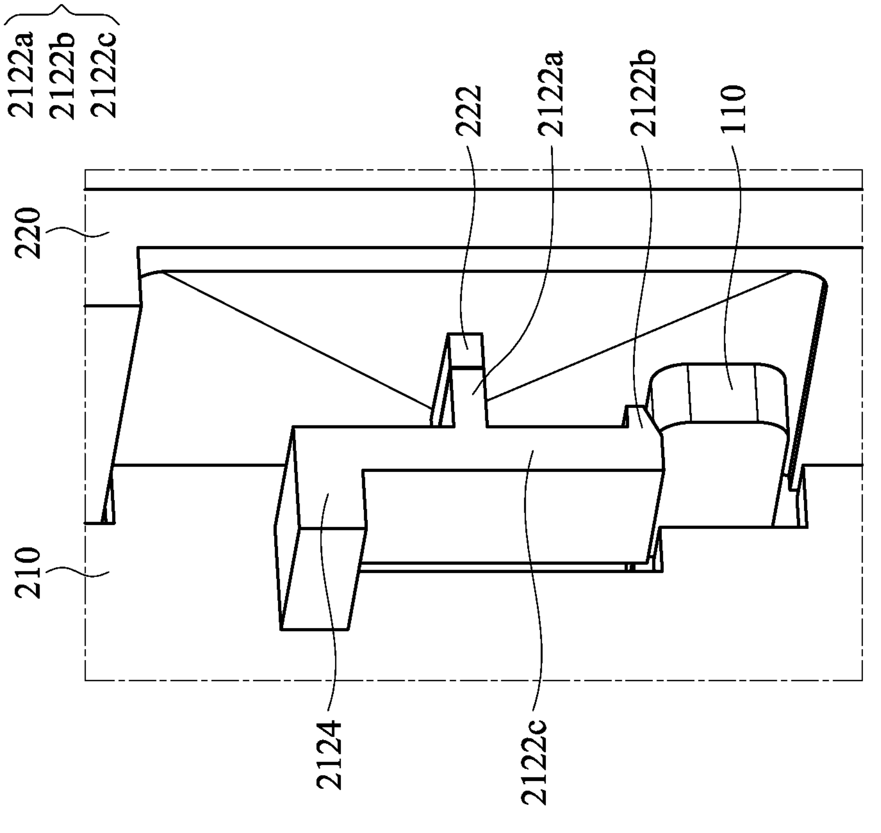
FIG. 3 is a front perspective schematic diagram of an extension, a buckle and a pushing portion when an electronic lock body is leaned against a bracket according to an embodiment of the present invention.

FIG. 3 is a front perspective schematic diagram of an extension, a buckle and a pushing portion when an electronic lock body is leaned against a bracket according to an embodiment of the present invention. FIG. 4 is a front perspective schematic diagram of the extension, the buckle and the pushing portion after the electronic lock body of FIG. 3 is moved downward. As shown in FIGS. 1 to 4, the back cover body 210 includes a buckle 212 disposed on a surface of the back cover body 210 facing away from the bracket 100 and adjacent to the side edge of the back cover body 210. As shown in FIGS. 3 and 4, the buckle 212 includes a cantilever portion 2122. In some embodiments, when an external force is applied to the cantilever portion 2122, the cantilever portion 2122 can move slightly; when the external force is removed, the cantilever portion 2122 can return to its original position. The cantilever portion 2122 includes a stop portion 2122*a* and a hook 2122*b*. The hook 2122*b* is coupled to the stop portion 2122*a* and located beneath the stop portion 2122*a*. In some embodiments, a vertical projection of the hook 2122*b* is within a vertical projection of the stop portion 2122*a*.

As shown in FIG. 3 and FIG. 4, when the back cover body 210 is leaned against the bracket and then moved downward, the buckle 212 is also moved downward, so that the stop portion 2122*a* and the hook 2122*b* abut an upper edge of the extension 110 of the bracket and a portion of a lower edge of the extension 110 of the bracket, respectively. In some embodiments, as shown in FIG. 4, a lower surface of the stop portion 2122*a* faces the upper edge of the extension 110, and an upper surface of the hook 2122*b* faces the portion of the lower edge of the extension 110.

In some embodiments, the buckle 212 further includes a fixing portion 2124, which is connected between the surface of the back cover body 210 facing away from the bracket and the cantilever portion 2122. The cantilever portion 2122 is connected to the back cover body 210 through the fixing portion 2124. In some embodiments, the stop portion 2122*a* extends in one direction. In some embodiments, the fixing portion 2124 extends in another direction opposite to the direction (i.e., the extending direction of the stop portion 2122*a*). In some embodiments, the vertical projection of the stop portion 2122*a* is misaligned with a vertical projection of the fixing portion 2124. In some embodiments, the fixing portion 2124 extending in the opposite direction makes the cantilever portion 2122 not easily deformed severely, so when the stop portion 2122*a* is subjected to an external force, it can ensure that the stop portion 2122*a* moves in a specific direction (e.g., moves laterally to the inside). However, the present invention is not limited to the above-mentioned embodiments, and shapes of the various portions of the buckle 212 can be adjusted appropriately according to material properties and/or user requirements.

In some embodiments, the cantilever portion 2122 further includes a connection portion 2122*c*, and opposite ends of the connection portion 2122*c* are respectively connected to the fixing portion 2124 and the hook 2122*b*, and a middle portion of the connection portion 2122*c* is connected to the stop portion 2122*a*. In some embodiments, an included angle between the fixing portion 2124 and the connection portion 2122*c* is about 90 degrees (e.g., between 85 degrees and 95 degrees), and an included angle between the stop portion 2122*a* and the connection portion 2122*c* is about 90 degrees (e.g., between 85 degrees and 95 degrees).

As shown in FIGS. 2 to 4, the main cover body 220 includes a pushing portion 222, which is disposed on an inner surface of a sidewall of the main cover body 220 and faces the stop portion 2122*a*. As shown in FIG. 4, when the pushing portion 222 is pushed toward the stop portion 2122*a*, the stop portion 2122*a* moves, and the hook 2122*b* also moves, so that the hook 2122*b* leaves the portion of the lower edge of the extension 110.

In some embodiments, as shown in FIG. 2, a thickness of a portion of the sidewall of the main cover body 220 adjacent to the pushing portion 222 is smaller than a thickness of another portion of the sidewall of the main cover body 220 away from the pushing portion 222. As such, as shown in FIG. 4, when personnel presses the portion of the sidewall of the main cover body 220 adjacent to the pushing portion 222, the portion is easily deformed, so that the pushing portion 222 can be pushed toward the stop portion 2122*a*.

The following describes the assembly method of the electronic lock body 200 of the present invention. Please refer to FIGS. 1, 3 and 4, personnel can lean the electronic lock body 200 (including the back cover body 210 and the main cover body 220) against the bracket 100 by one hand, and then move it downward, at this time the stop portion 2122*a* and the hook 2122*b* abut the upper edge of the extension 110 of the bracket 100 and the portion of the lower edge of the extension 110 of the bracket, respectively, so that the back cover body 210 cannot be moved up and down.

Figure 5:
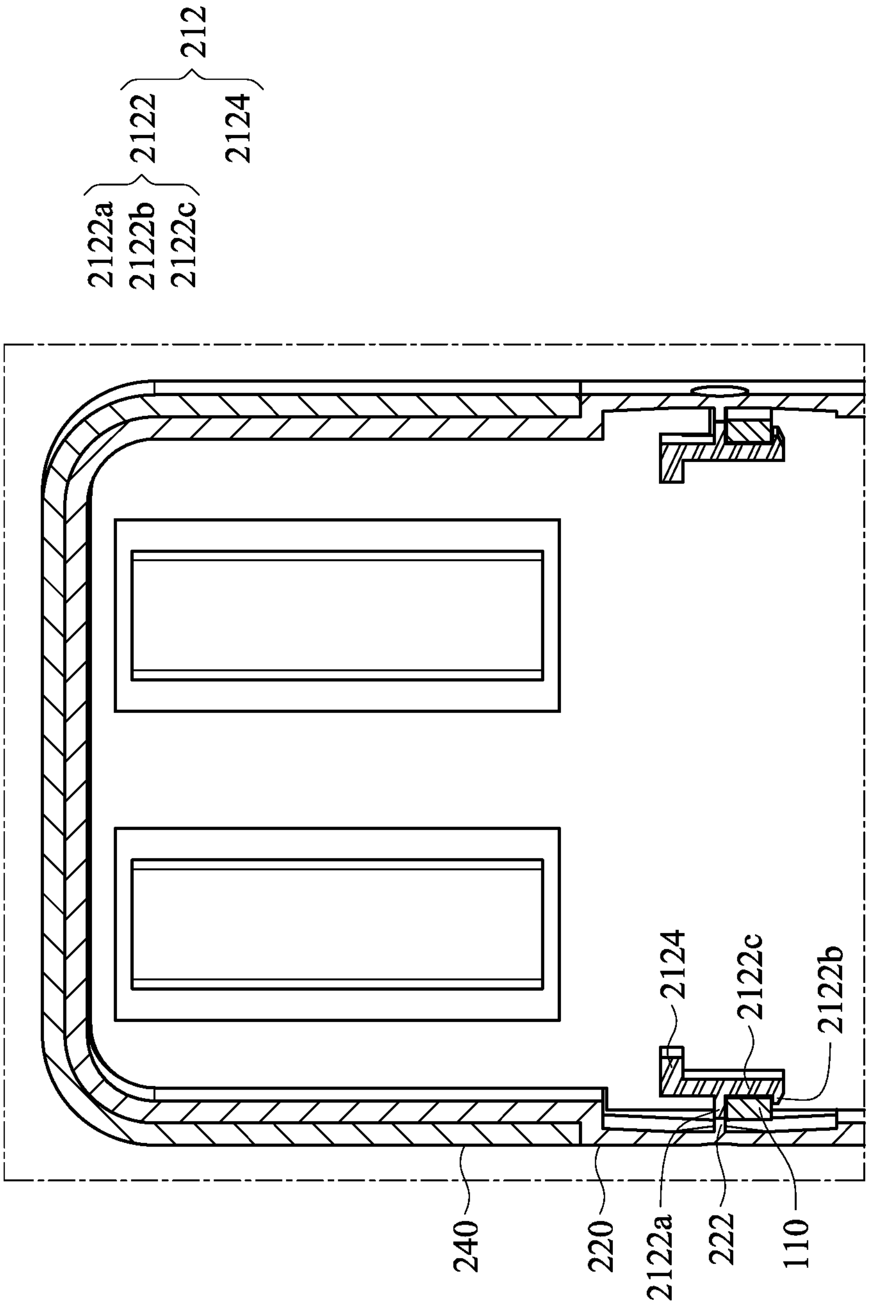
FIG. 5 is a rear cross-sectional view of an extension and an electronic lock body according to an embodiment of the present invention.

The disassembly method of the electronic lock body 200 of the present invention is described below. FIG. 5 is a rear cross-sectional view of an extension and an electronic lock body according to an embodiment of the present invention. Please refer to FIGS. 4 and 5, personnel can press a sidewall of the main cover body 220 adjacent to the pushing portion 222 by one hand (please refer to FIG. 5, personnel can press two opposite sidewalls of the main cover body 220 respectively adjacent to two opposite pushing portions 222 by one hand), making it slightly deformed, so that the pushing portion 222 is pushed toward the stop portion 2122*a*, at this time the stop portion 2122*a* moves, and the hook 2122*b* also moves to leave the portion of the lower edge of the extension 110. As such, the back cover body 210 can be moved upward subsequently, and personnel can move the entire electronic lock body 200 upward by one hand.

The above assembly and disassembly processes do not require any additional tools. Compared with the electronic lock of the related art, the electronic lock components of the present invention can be quickly assembled and disassembled by one hand, and the assembly and disassembly methods are very simple.

FIG. 6 is a side cross-sectional view of an electronic lock body leaned against a bracket according to an embodiment of the present invention. FIG. 7 is a side cross-sectional view of the electronic lock body of FIG. 6 after being moved downward.

As shown in FIGS. 6 and 7, the bracket 100 is configured to be assembled on the door panel 50. In some embodiments, as shown in FIGS. 1, 2, 6 and 7, the bracket 100 further includes a hook portion 120 connected to the bracket 100 and separated from the extension 110. In some embodiments, the back cover body 210 includes a direction limiting piece 214, which is separated from the buckle 212. The direction limiting piece 214 and the back cover body 210 define a back opening 214*b* and an upper opening 214*u*, and the back opening 214*b* is located on a surface of the back cover body 210 facing the bracket 100, and the upper opening 214*u* is close to a portion of the surface of the back cover body 210 facing away from the bracket 100.

In some embodiments, as shown in FIGS. 1, 2, 6 and 7, the hook portion 120 includes a horizontal portion 122 and a vertical portion 124, and the horizontal portion 122 is connected between the bracket 100 and the vertical portion 124. In some embodiments, as shown in FIGS. 1 and 2, the bracket 100 has an opening 100*t*, and the horizontal portion 122 is connected between a lower wall of the opening 100*t* and the vertical portion 124. In some embodiments, as shown in FIG. 6, when the back cover body 210 is leaned against the bracket 100 and the back opening 214*b* is aligned with the hook portion 120, the direction limiting piece 214 covers the hook portion 120; next, as shown in FIGS. 6 and 7, when the back cover body 210 is moved downward, the direction limiting piece 214 is also moved downward, so that a portion (e.g., the vertical portion 124) of the hook portion 120 is exposed from the upper opening 214*u*, and another portion (e.g., at least one portion of the horizontal portion 122) of the hook portion 120 is in contact with an upper wall of the back opening 214*b*. As shown in FIG. 7, since the other portion (e.g., the at least one portion of the horizontal portion 122) of the hook portion 120 is in contact with (or can be called against) the upper wall of the back opening 214*b*, the back cover body 210 cannot be moved downward.

In some embodiments, as shown in FIG. 7, the portion (e.g., the vertical portion 124) of the hook portion 120 exposed from the upper opening 214*u* is in contact with the portion of the surface of the back cover body 210 facing away from the bracket 100, so that the back cover body 210 cannot be moved forward, that is, the back cover body 210 cannot move away from the door panel 50. In some embodiments, a shape of the portion (e.g., the vertical portion 124) of the hook portion 120 is complementary to a shape of the portion of the surface of the back cover body 210 facing away from the bracket 100, so that paragraph sense is produced when the electronic lock body 200 is assembled.

In some embodiments, as shown in FIGS. 6 and 7, the electronic lock body 200 further includes a rotating shaft 230 inside the main cover body 220. In some embodiments, the electronic lock body 200 further includes an upper cover 240 covering a portion of the main cover body 220. The upper cover 240 may be, for example, a battery cover.

Figure 9:
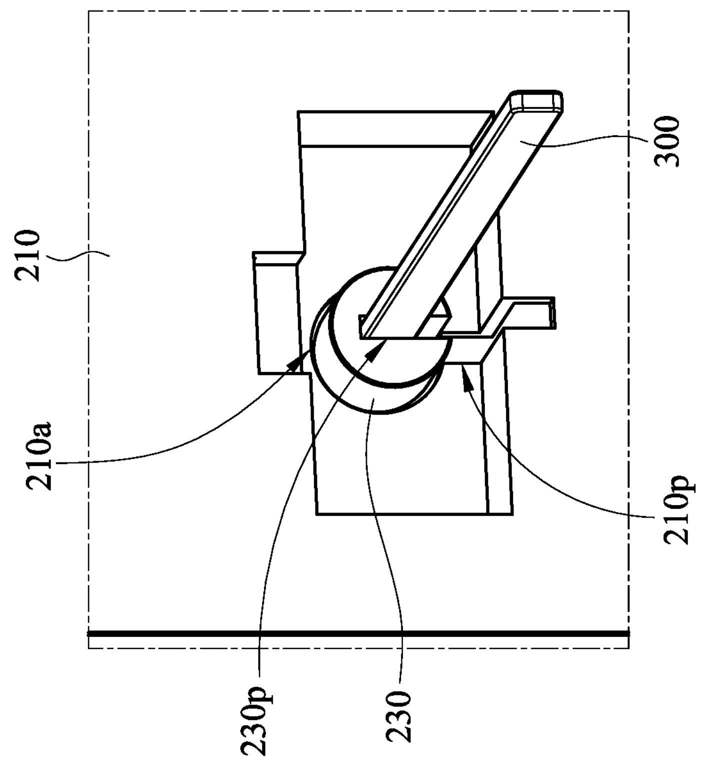
FIG. 9 is a rear perspective schematic diagram of a rotating shaft and a tail piece in FIG. 7.
Figure 8:
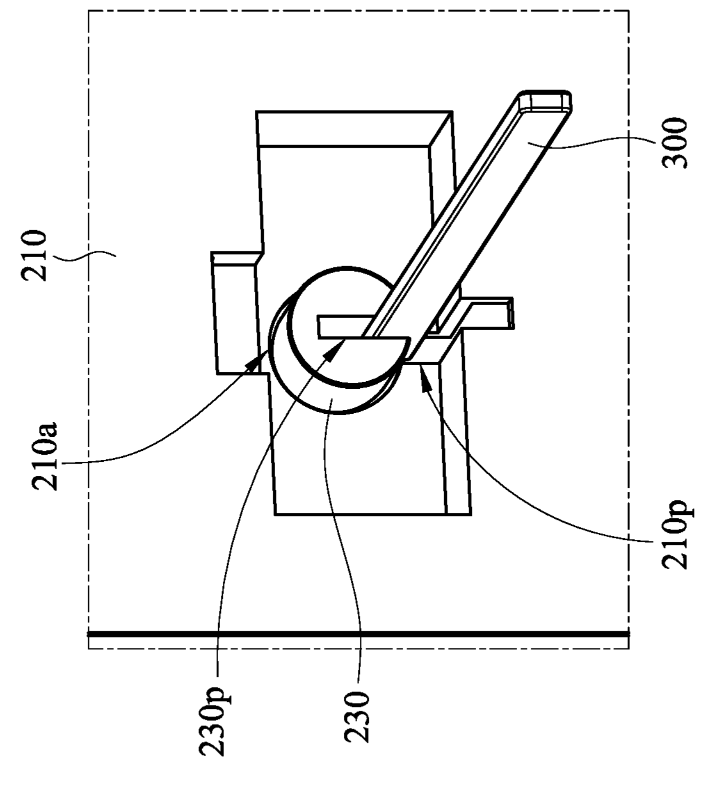
FIG. 8 is a rear perspective schematic diagram of a rotating shaft and a tail piece in FIG. 6.

In some embodiments, as shown in FIGS. 6 and 7, the electronic lock components further includes a tail piece 300 through the bracket 100 and the back cover body 210. FIG. 8 is a rear perspective schematic diagram of a rotating shaft and a tail piece in FIG. 6. FIG. 9 is a rear perspective schematic diagram of a rotating shaft and a tail piece in FIG. 7. In some embodiments, as shown in FIGS. 8 and 9, the rotating shaft 230 has an opening 230*p*, and the opening 230*p* has an open end (not shown) and a closed end (not shown), and the open end is located beneath the closed end, and the open end faces downward. When the back cover body is leaned against the bracket and then moved downward, the rotating shaft 230 is also moved downward, so that the closed end of the opening 230*p* engages an end of the tail piece 300. In some embodiments, as shown in FIG. 8, the open end of the opening 230*p* is able to accommodate a portion of the end of the tail piece 300 when the back cover body 210 is leaned against the bracket 100.

In some embodiments, as shown in FIGS. 1, 2, 8 and 9, the back cover body 210 further has a tail piece mounting hole 210*p* through the back cover body 210. In some embodiments, as shown in FIG. 8, the tail piece mounting hole 210*p* is able to accommodate a portion of the end of the tail piece 300 when the back cover body 210 is leaned against the bracket 100.

In some embodiments, as shown in FIGS. 1, 2, 6 to 9, the back cover body 210 further has a shaft hole 210*a* through the back cover body 210, and the shaft hole 210*a* is located over and communicates with the tail piece mounting hole 210*p*, and the rotating shaft 230 is located in the shaft hole 210*a*.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not used to limit the scope of claims of the present disclosure.

What is claimed is:

1. Electronic lock components, comprising:

a bracket, configured to be mounted on a door panel, the bracket comprising:

an extension, disposed on a side edge of the bracket and perpendicular to the bracket; and an electronic lock body, configured to be assembled on the bracket or disassembled from the bracket, the electronic lock body comprising:

a back cover body, including a buckle disposed on a surface of the back cover body facing away from the bracket and adjacent to a side edge of the back cover body, and the buckle including a cantilever portion, and the cantilever portion including a stop portion and a hook coupled to and located beneath the stop portion, wherein when the back cover body is leaned against the bracket and then moved downward, the buckle is also moved downward, so that the stop portion and the hook abut an upper edge of the extension and a portion of a lower edge of the extension, respectively, wherein the buckle further includes a fixing portion connected between the surface of the back cover body facing away from the bracket and the cantilever portion, wherein the cantilever portion further includes a connection portion, and opposite ends of the connection portion are respectively connected to the fixing portion and the hook, and a middle portion of the connection portion is connected to the stop portion; and a main cover body, including a pushing portion disposed on an inner surface of a sidewall of the main cover body and facing the stop portion, wherein when the pushing portion is pushed toward the stop portion, the stop portions moves, and the hook also moves to leave the portion of the lower edge of the extension.

2. The electronic lock components of claim 1, wherein the stop portion extends in one direction, and the fixing portion extends in another direction opposite to the direction.

3. The electronic lock components of claim 1, wherein an included angle between the fixing portion and the connection portion is about 90 degrees, and an included angle between the stop portion and the connection portion is about 90 degrees.

4. The electronic lock components of claim 1, wherein a thickness of a portion of the sidewall of the main cover body adjacent to the pushing portion is smaller than a thickness of another portion of the sidewall of the main cover body away from the pushing portion.

5. The electronic lock components of claim 1, wherein the bracket further includes a hook portion connected to the bracket, and the back cover body further includes a direction limiting piece separated from the buckle, and the direction limiting piece and the back cover body define a back opening and an upper opening, and the back opening is located on a surface of the back cover body facing the bracket, and the upper opening is close to a portion of the surface of the back cover body facing away from the bracket, wherein when the back cover body is leaned against the bracket and the back opening is aligned with the hook portion, the direction limiting piece covers the hook portion, and when the back cover body is then moved downward, the direction limiting piece is also moved downward, so that a portion of the hook portion is exposed from the upper opening, and another portion of the hook portion is in contact with an upper wall of the back opening.

6. The electronic lock components of claim 5, wherein the portion of the hook portion is in contact with the portion of the surface of the back cover body facing away from the bracket.

7. The electronic lock components of claim 6, wherein a shape of the portion of the hook portion is complementary to a shape of the portion of the surface of the back cover body facing away from the bracket.

8. The electronic lock components of claim 1, further comprising:

a tail piece, through the bracket;

wherein the electronic lock body further includes a rotating shaft located in the main cover body, and the rotating shaft has an opening, and an open end of the opening faces downward, wherein when the back cover body is leaned against the bracket and then moved downward, the rotating shaft is also moved downward, so that a closed end of the opening engages with an end of the tail piece.

9. The electronic lock components of claim 8, wherein when the back cover body is leaned against the bracket, the open end of the opening is able to accommodate a portion of the end of the tail piece.

10. The electronic lock components of claim 8, wherein the back cover body further has a tail piece mounting hole through the back cover body, wherein when the back cover body is leaned against the bracket, the tail piece mounting hole is able to accommodate a portion of the end of the tail piece.

11. The electronic lock components of claim 10, wherein the back cover body further has a shaft hole through the back cover body, and the shaft hole is located over and communicates with the tail piece mounting hole, and the rotating shaft is located in the shaft hole.

12. Electronic lock components, comprising:

a bracket, configured to be mounted on a door panel, the bracket comprising:

an extension, disposed on a side edge of the bracket and perpendicular to the bracket; and an electronic lock body, configured to be assembled on the bracket or disassembled from the bracket, the electronic lock body comprising:

a back cover body, including a buckle disposed on a surface of the back cover body facing away from the bracket and adjacent to a side edge of the back cover body, and the buckle including a cantilever portion, and the cantilever portion including a stop portion and a hook coupled to and located beneath the stop portion, wherein when the back cover body is leaned against the bracket and then moved downward, the buckle is also moved downward, so that the stop portion and the hook abut an upper edge of the extension and a portion of a lower edge of the extension, respectively; and a main cover body, including a pushing portion disposed on an inner surface of a sidewall of the main cover body and facing the stop portion, wherein when the pushing portion is pushed toward the stop portion, the stop portion moves, and the hook also moves to leave the portion of the lower edge of the extension, wherein the bracket further includes a hook portion connected to the bracket, and the back cover body further includes a direction limiting piece separated from the buckle, and the direction limiting piece and the back cover body define a back opening and an upper opening, and the back opening is located on a surface of the back cover body facing the bracket, and the upper opening is close to a portion of the surface of the back cover body facing away from the bracket, wherein when the back cover body is leaned against the bracket and the back opening is aligned with the hook portion, the direction limiting piece covers the hook portion, and when the back cover body is then moved downward, the direction limiting piece is also moved downward, so that a portion of the hook portion is exposed from the upper opening, and another portion of the hook portion is in contact with an upper wall of the back opening.

13. The electronic lock components of claim 12, wherein the portion of the hook portion is in contact with the portion of the surface of the back cover body facing away from the bracket.

14. The electronic lock components of claim 13, wherein a shape of the portion of the hook portion is complementary to a shape of the portion of the surface of the back cover body facing away from the bracket.

15. Electronic lock components, comprising:

a bracket, configured to be mounted on a door panel, the bracket comprising:

an extension, disposed on a side edge of the bracket and perpendicular to the bracket; and an electronic lock body, configured to be assembled on the bracket or disassembled from the bracket, the electronic lock body comprising:

a back cover body, including a buckle disposed on a surface of the back cover body facing away from the bracket and adjacent to a side edge of the back cover body, and the buckle including a cantilever portion, and the cantilever portion including a stop portion and a hook coupled to and located beneath the stop portion, wherein when the back cover body is leaned against the bracket and then moved downward, the buckle is also moved downward, so that the stop portion and the hook abut an upper edge of the extension and a portion of a lower edge of the extension, respectively;

a main cover body, including a pushing portion disposed on an inner surface of a sidewall of the main cover body and facing the stop portion, wherein when the pushing portion is pushed toward the stop portion, the stop portion moves, and the hook also moves to leave the portion of the lower edge of the extension; and a tail piece, through the bracket;

wherein the electronic lock body further includes a rotating shaft located in the main cover body, and the rotating shaft has an opening, and an open end of the opening faces downward, wherein when the back cover body is leaned against the bracket and then moved downward, the rotating shaft is also moved downward, so that a closed end of the opening engages with an end of the tail piece.

16. The electronic lock components of claim 15, wherein when the back cover body is leaned against the bracket, the open end of the opening is able to accommodate a portion of the end of the tail piece.

17. The electronic lock components of claim 15, wherein the back cover body further has a tail piece mounting hole through the back cover body, wherein when the back cover body is leaned against the bracket, the tail piece mounting hole is able to accommodate a portion of the end of the tail piece.

18. The electronic lock components of claim 17, wherein the back cover body further has a shaft hole through the back cover body, and the shaft hole is located over and communicates with the tail piece mounting hole, and the rotating shaft is located in the shaft hole.

* * * * *